United States Patent [19]
Carter

[11] Patent Number: 6,101,696
[45] Date of Patent: Aug. 15, 2000

[54] PIPE END BURNISHING TOOL

[76] Inventor: Sam W. Carter, 4170 Indian Hills Trail, West Branch, Mich. 48661

[21] Appl. No.: 09/186,838

[22] Filed: Nov. 5, 1998

[51] Int. Cl.⁷ .......................... B21C 37/30; B24B 39/00; B21D 1/02; B21D 3/02
[52] U.S. Cl. ............................................ 29/90.01; 72/112
[58] Field of Search ............................. 29/90.01; 72/112, 72/479

[56] References Cited

U.S. PATENT DOCUMENTS

| | | |
|---|---|---|
| 505,960 | 10/1893 | Scholz . |
| 2,188,584 | 1/1940 | Tyne . |
| 2,188,624 | 1/1940 | Dantry et al. . |
| 2,645,000 | 7/1953 | Neale . |
| 2,748,631 | 6/1956 | Neale . |
| 2,838,773 | 6/1958 | Muse . |
| 2,838,828 | 6/1958 | Nordstrom . |
| 2,855,811 | 10/1958 | Fried . |
| 3,162,893 | 12/1964 | Townsend ................. 452/47 |
| 3,763,510 | 10/1973 | Graham . |
| 3,818,559 | 6/1974 | Benson ................... 29/90.01 |
| 3,840,957 | 10/1974 | Kopplemann ........... 29/90.01 |
| 3,870,432 | 3/1975 | Strybel . |
| 3,976,388 | 8/1976 | Webb . |
| 4,033,163 | 7/1977 | Duffey et al. .............. 72/121 |
| 4,076,446 | 2/1978 | Lindsteadt . |
| 4,246,728 | 1/1981 | Leasher . |
| 4,468,829 | 9/1984 | Christiansen . |
| 5,180,260 | 1/1993 | Phillips, Sr. . |

*Primary Examiner*—S. Thomas Hughes
*Assistant Examiner*—Marc Jimenez
*Attorney, Agent, or Firm*—Reising, Ethington, Barnes, Kisselle, Learman & McCulloch P.C.

[57] ABSTRACT

The burnishing tool has a shank that is mountable in a hand drill chuck. An end of the shank is received in a bore in an inside member with a conical inside burnishing surface. A transverse shaft passes through a slot through the inside member and a bore through the spindle to connect the inside member to the shank and to permit limited axial movement between the inside member and the shank. A cup member with an outside conical burnishing surface has a hub that receives a post on the inside member. The transverse shaft that connects the inside member to the shank also passes through a bore through the hub to secure the cup member to the shank. The connections between the shank, the inside member and the cup member permit movement of these members relative to each other to align the conical burnishing surfaces with pipe surfaces. The burnishing tool for two pipe diameters has a shank with a first conical burnishing surface on a shank. Second and third conical burnishing surfaces are on an inside cup member that receives the shank and is axially movable relative to the shank. A fourth conical burnishing surface is on an outside cup member that receives the shank and is substantially axially fixed relative to the shank.

11 Claims, 5 Drawing Sheets

PIPE END BURNISHING TOOL

TECHNICAL FIELD

This invention relates to a pipe end burnishing tool and more particularly to a burnishing tool mounted on an electric hand drill that simultaneously burnishes the inside as well as the outside surfaces of the cut end of a pipe.

BACKGROUND OF THE INVENTION

Conduit pipes, for housing and protecting electrical wires, are generally cut to lengths at construction sites. Historically a pipe cutter with two rollers and a rotating cutter disk was used to cut pipe. These cutters are hand operated, slow, reduce the inside diameter of pipes and form sharp edges on the inside of pipes. Sharp edges have been flattened to some extent by hand reamers that ream the inside only. Hand reaming is also a slow operation and generally does not restore the inside diameter of the pipe.

Electricity is available on most construction sites today. The old hand cutters with a rotating cutter disk have been replaced by power cutters that can cut a two inch diameter pipe in seconds. These power cutters include band saws, jigsaws, chop saws, etc. Some of these saws have teeth that cut metal. Others have rotating disks with an abrasive material that cuts metal. All of them are relatively fast.

The cuts made by the motor driven cutters described above do not reduce the inside diameter of a pipe significantly. However they do leave sharp edges and burrs. These sharp edges and burrs can damage insulation and they also damage the wire covered by the insulation. Sharp edges and burrs also make it difficult to pull cables through the conduit.

Removal of sharp edges and burrs from the cut ends of conduit is complicated by the fact that the cuts made by power saws may not be perpendicular to the center axis of the pipe. When the end of a pipe is cut at an angle of less than 90° relative to the axis of the pipe, the sharp edges that are produced become elliptical. Removing sharp edges of an elliptical surface generally results in too much material being removed in some areas. Pipes tend to be weakened in areas where excess material is removed.

SUMMARY OF THE INVENTION

An object of the invention is to provide a power driven burnishing tool for removing burrs and sharp edges from the end of a pipe.

Another object of the invention is to provide a power driven burnishing tool that simultaneously removes sharp edges and burrs from the inside and the outside surfaces on the end of a pipe.

A further object of the invention is to provide a burnishing tool that compensates for variations in the thickness of pipe walls.

A still further object of the invention is to provide a burnishing tool that is self-aligning.

A yet still further object of the invention is to provide a burnishing tool that does not lock to a pipe and rotate the pipe.

The pipe and burnishing tool has an inside member with an inside conical burnishing surface, a cup member with an outside conical burnishing surface and a shank connected to the inside member and the cup member. During use of the burnishing tool, the shank is mounted in the chuck of a drill. The connection between the shank and the inside member permits limited axial movement of the inside member relative to the shank. A compression spring urges the inside member axially away from the shank and the drill that rotates the shank. A loose coupling between the shank and the inside member permits the axis of the conical burnishing surface on the inside member to move to one side of the axis of the shank. This loose coupling also permits the axis of the conical surface on the inside member to move out of a position parallel to the axis of the shank.

The cup member is mounted on the shank in a position in which the outside conical burnishing surface is facing the inside conical burnishing surface. The cup member is axially fixed relative to the axis of the shank. However the connection between the shank and the cup member permit the axis of the outside burnishing surface to move to one side of the axis of the shank and to move to the side of the axis of the inside burnishing surface. The connection between the cup member and the shank also permits the axis of the inside conical burnishing surface to move out of a position in axial alignment with the axis of the outside conical burnishing surface.

Axial movement of the inside member relative to the cup member permits the tool to adjust to variations in pipe wall thickness and in pipe diameter and simultaneously burnish the inside surface and the outside surface of the cut end of a pipe. The loose fit between the shank, the inside member and the cup member accommodates variations in the alignment between the axis of the pipe and the cut end surface of a pipe as well as variations in alignment of the axis of the shank and the axis of a cut pipe.

BRIEF DESCRIPTION OF THE DRAWINGS

The presently preferred embodiment of the invention is disclosed in the following description and in the accompanying drawings, wherein.

DESCRIPTION OF THE PREFERRED EMBODIMENT

The burnishing tool 10 has a shank 12, an inside member 14, a cup member 16, a compression spring 18, a bolt 20 and a nut 22. The shank 12 is a cylindrical rod with a transverse bore 24 on one end. A spring abutment surface 26 is on the one end adjacent to the transverse bore 24. The other end of the shank 12 is received in the chuck 27 of a drill. The drill is generally a hand drill with an electric, pneumatic or hydraulic motor drive. Due to the variable torque loads on the burnishing tool 10, it is desirable to provide flat surfaces 28 on the shank, that are parallel to the axis of the shank. These flat surfaces 28 are engaged by the drill chuck and prevent rotation of the shank relative to the chuck.

Figures 1, 2:
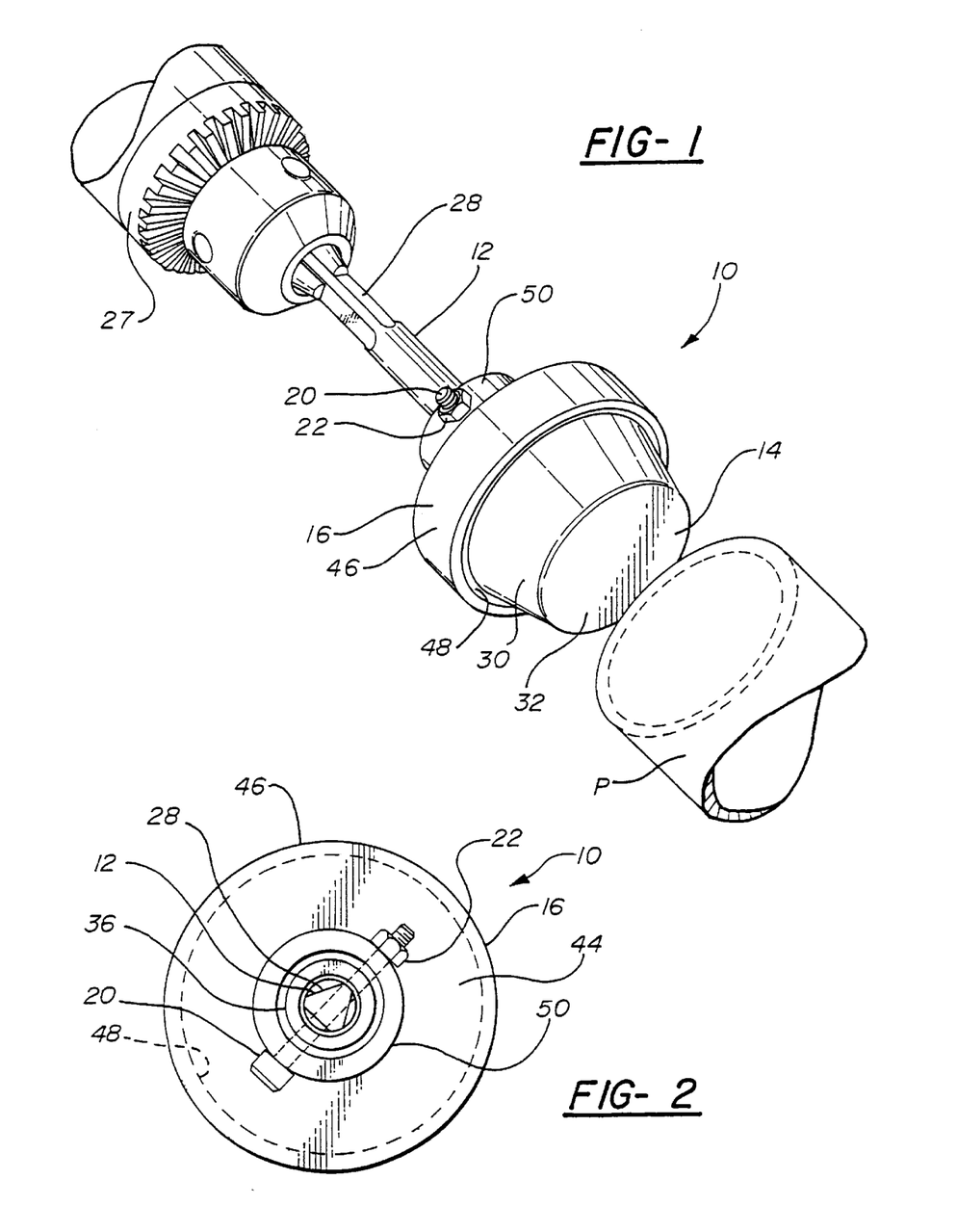
FIG. 1 is a perspective view of a pipe end burnishing tool mounted in a drill chuck and aligned with the end of a pipe that is to be burnished.
FIG. 2 is an end view of the pipe end burnishing tool showing the shank.
Figure 3:
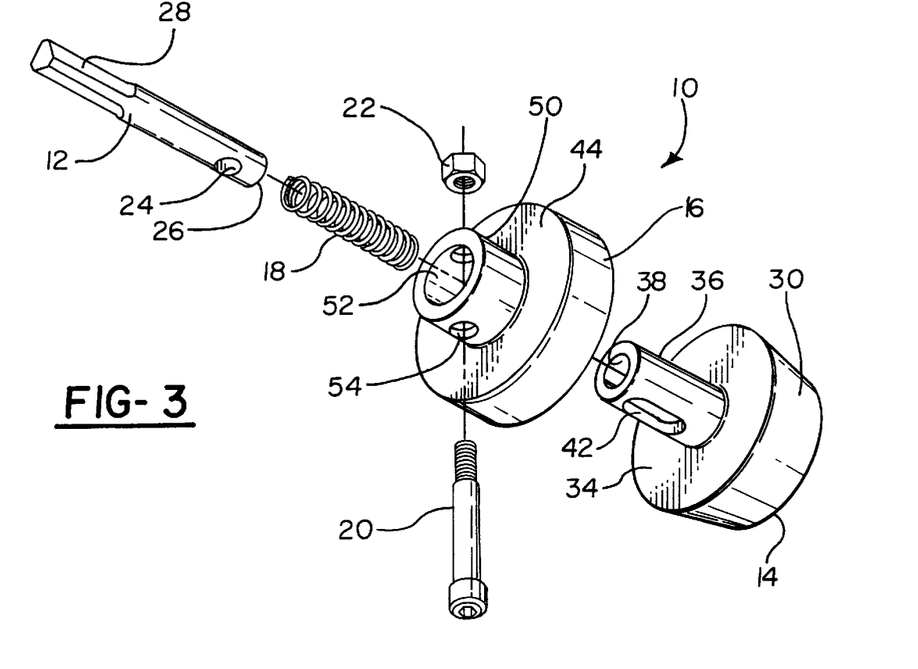
FIG. 3 is an expanded view of the pipe end burnishing tool.
Figure 4:
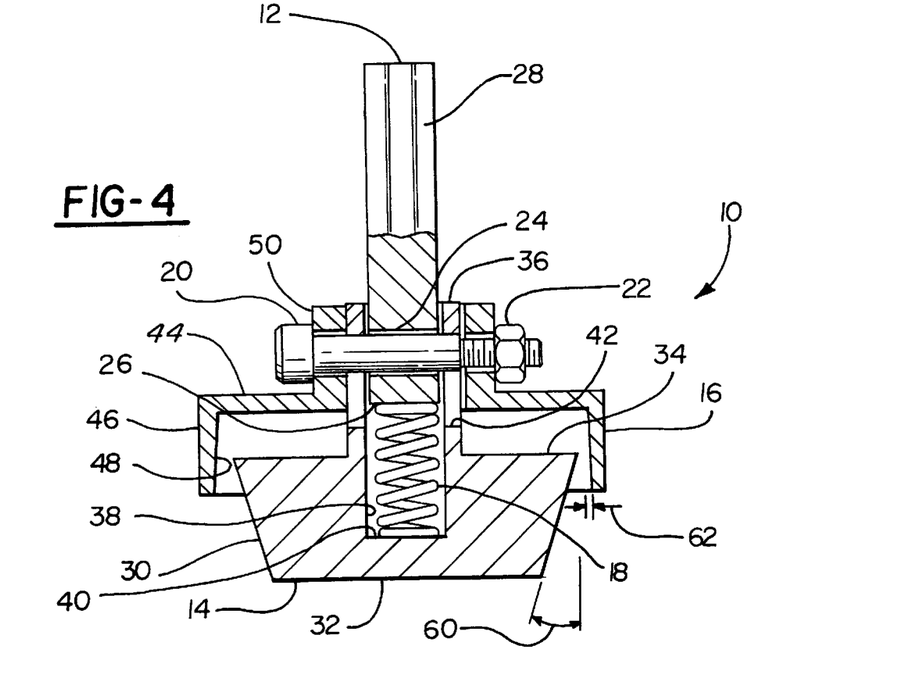
FIG. 4 is a sectional view of the pipe end burnishing tool taken in a plane containing the axis of rotation of the tool.
Figure 5:
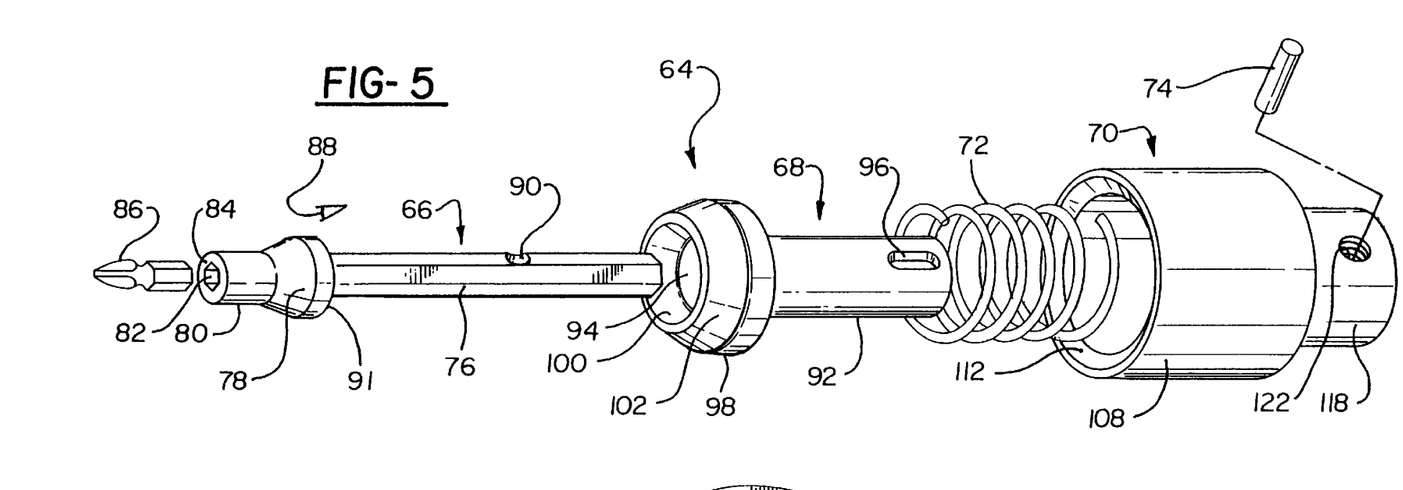
FIG. 5 is an expanded perspective view of a pipe end burnishing tool that is modified to burnish the cut ends of two pipes with different nominal diameters.
Figure 6:
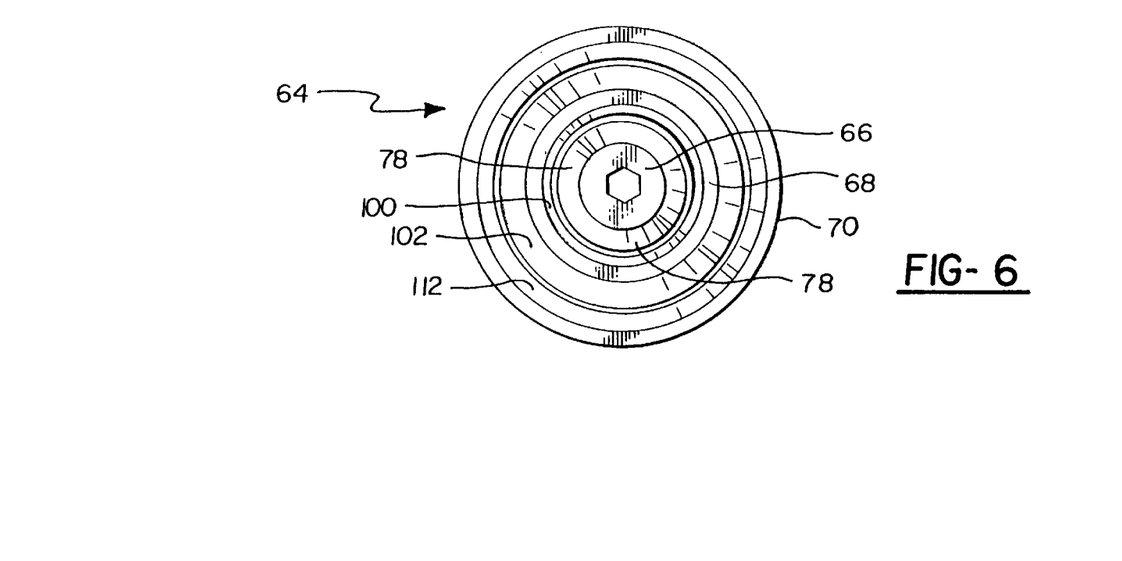
FIG. 6 is an end view of the burnishing tool of FIG. 5.

Inside member 14 has a conical burnishing surface 30 that is concentric with an axis of the inside member. This conical surface 30 burnishes the inside surface of the cut end of a conduit and extends from a flat end surface 32 to an end surface 34. An integral post 36 extends axially from the end surface 34. A bore 38 in the post 36 has a flat bottom spring abutment surface 40. A transverse slot 42 passes through the post 36 in a position spaced from the spring abutment surface 40.

The conical burnishing surface 30 on the inside member 14 is a hardened steel surface. When this hardened steel surface 30 is rotated and contacts the inside of a metal conduit pipe, it removes burrs and sharp edges and reshapes the surfaces of the conduit that are contacted. Wear on the conical surface 30 during burnishing operations is negligible.

The cup member 16 has a transverse plate member 44. An axially extending circular skirt 46 is integral with the radially outer portion of the plate member 44. A conical burnishing surface 48 on the circular skirt 46 contacts the outside surface on the cut end of a conduit pipe during burnishing operations. A hub 50 is integral with the plate 44. The central bore 52 through the hub 50 and the plate 44 is concentric with the conical burnishing surface 48 on the skirt 46. The burnishing surface 48 is a hardened steel surface like burnishing surface 30 described above. A transverse cup mounting bore 54 passes through the hub 50.

To assemble the burnishing tool 10, the compression spring 18 is inserted into the bore 38 in the inside member 14. The shank 12 is inserted into the bore 38 with a spring 18 between the spring abutment surface 40 in the bore 38 and the spring abutment surface 26 on the shank 12. The cup member 16 is positioned over the inside member 14 with a post member 36 extending into the hub 50. The compression spring 18 is preloaded by forcing the shank 12 into the bore 38 and then inserting a bolt 20 through the cup mounting bore 54, the transverse slot 42 and the transverse bore 24 through the shank 12. A nut 22 secures the bolt 20 in the hub 50.

The nut 22 is a lock nut and does not clamp the bolt 20 to the hub 50. The somewhat loose fit between the bolt 20 and the transverse cup mounting bore 54 allows the cup member 16 to shift laterally and angularly relative to the shank 12 and align with an outside surface that is to be burnished. The bolt 20 preferably fits fairly snugly in the transverse bore 24 to reduce wear. A steel roll pin can be used in place of the bolt 20. When a steel roll pin is used, it preferably fits tightly in the transverse bore 24 and somewhat loosely in the slot 42 and the transverse cup mounting bore 54.

The cup member 16 is axially fixed relative to the shank 12 by the bolt 20. The inside member 14 is axially movable relative to the shank 12, the bolt 12 and the cup member 16 because of the slot 42. The compression spring 18 biases the inside member 14 toward a position out of the cup member 16 and into a position with the end of the slot 42 furthest from the end surface 34 in contact with the bolt 20. During use of the burnishing tool 10, the inside member 14 enters the end of a pipe and the inside conical burnishing surface 30 engages the inside surface of the pipe adjacent to a cut end surface on the pipe in response to axial movement of the burnishing tool 10 and a drill axially toward the pipe. Continued movement of the drill toward the pipe P compresses the spring 18 and moves the outside conical burnishing surface 48 into engagement with the outside surface of the pipe adjacent to the cut end surface. Further axial force on the burnishing tool toward the pipe controls the force exerted on the pipe by the cup member 16 and the conical surface 48 while the spring 18 controls the force exerted on the pipe by the inside member 14 and the conical surface 30. The axial movement of the cup member 16 relative to the inside member 14 permitted by the transverse slot 42 and the spring 18 adjusts the position of the cup member relative to the inside member to accommodate variations in pipe wall thickness. Without axial movement between the cup member 16 and the inside member 14, a pipe with thicker walls than usual would be burnished by the conical surface 48 only and a pipe with thinner walls than usual would be burnished by the conical surface 30 only.

The inside member 14 could be axially fixed relative to the shank 12 and the cup member 16 could be spring biased if desired. This arrangement would function well.

Alignment of the axis of the spindle 12 with the axis of the pipe P that is being burnished is generally somewhat less than perfect. The saws used to cut conduit and other pipes to length quickly cut pipe in a plane that is not always perpendicular to the center line of the pipe to be burnished. These problems are overcome by providing a loose fit between the bore 38 and the shank 12 and providing a loose fit between the post 36 and the central bore 52 through the hub 50. The cup member 16 and the inside member 14 are also permitted to move relative to each other and to the shank 12 about an axis transverse to the axis of the bolt 22. These loose fits allow the conical burnishing surfaces 30 and 48 to shift and contact the surfaces to be burnished in a substantially full 360° circle.

The angle 60 of the inside conical surface 30 relative to the axis of the inside conical surface is 15°. The angle 62 of the outside conical surface 48 relative to the axis of the outside conical surface is 10°. These angles 60 and 62 can be varied somewhat. However, if they are increased more than about 2°, the time required to burnish the surfaces increases and burrs tend to be rolled or shaped in place rather than removed. If the angles 60 and 62 are decreased more than about 2°, there is a tendency for pipes to lock relative to the conical surfaces 30 and 48 and rotate with the burnishing tool 10. The axial length of the conical surfaces 30 and 48 is sufficient to burnish pipes P with a range of wall thicknesses. However, a different burnishing tool is used for each nominal pipe diameter. The burnishing tool 10 shown in FIGS. 1 through 4 are generally for pipes P with a nominal diameter of one to four inches or more. Smaller diameter pipes can be burnished with the burnishing tool 64 shown in FIGS. 5 through 10.

The burnishing tool 64 has a shank 66, an inner cup member 68, an outer cup member 70, a compression spring 72 and a retainer pin 74. The shank 66 has flat surfaces 76 that are engaged by the chuck 27 of a drill. Hardened steel conical burnishing surface 78 for burnishing the inside surface of the end of a small diameter pipe P is provided on one end of the shank 66 adjacent to a cylindrical guide section 80 for guiding the shank into an end of a pipe P. A hexagonal passage 82 that is concentric with the axis of a shank 66 is provided in the end 84 of the shank. The hexagonal passage 84 can accept screwdriving tools 86. This allows the drill to drive screws without removing the burnishing tool 64. The angle 88 of the conical burnishing surface 78 relative to the axis of the shank 66 is 15°. A transverse bore 90 for receiving the retaining pin 74, is provided in the shank 66. A stop surface 91, in a plane perpendicular to the axis of rotation of the shank 66, faces toward the bore 90.

The inner cup member 68 has a hub 92 with a central bore 94. A transverse slot 96 passes through the hub 92. A flange 98 is integral with one end of the hub 92. A hardened steel conical burnishing surface 100 on the flange 98 cooperates with the conical burnishing surface 78 and burnishes the outside surface on the end of a small diameter pipe P. Another hardened steel conical burnishing surface 102 on the flange 98 burnishes the inside surface on the end of a large diameter pipe P. A spring abutment surface 104 on the flange 98 is in a plane that is perpendicular to the axis of rotation of the burnishing tool 64. An integral stop surface 105 cooperates with the stop surface 91 to limit axial movement of the inner cup member 68 in one direction.

The outer cup member 70 has a plate member 106 and an axially extending skirt 108. The skirt 108 has a cylindrical outer surface 110. A hardened steel conical burnishing surface 112 faces inwardly on the inside of the skirt 108. A spring abutment surface 114 on the plate member 106 faces toward the open end 116 of the skirt 108. A hub 118 is integral with the plate member 106 and extends axially from the plate member on the opposite side from the skirt 108. The hub 118 has a bore 120 that receives the hub 92 of the inner cup member 68. A transverse bore 122 is provided through the hub 118.

Figure 7:
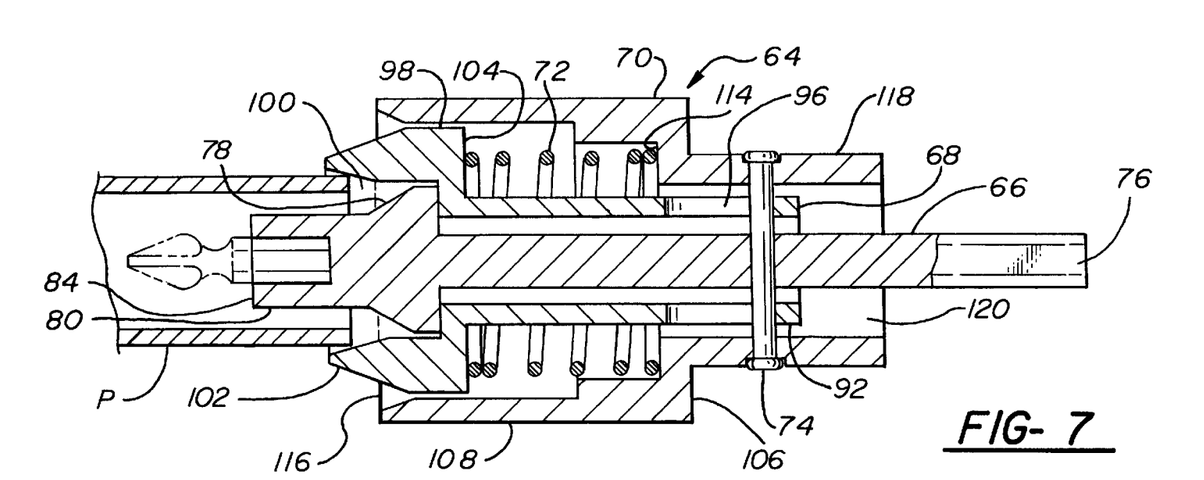
FIG. 7 is a sectional view of the burnishing tool of FIG. 5 with the outside surface of a small diameter pipe in contact with a conical burnishing surface.

To assemble the pipe end burnishing tool 64, the inner cup member 68 is slid over the end of the shank 66 and the stop surface 105 is moved into contact with the stop surface 91 as shown in FIG. 7. The coil compression spring 72 is slid over the hub 92 of the inner cup member 68 and into contact with the spring abutment surface 104. The outer cup member 70 is placed over the hub 92 and the spring abutment surface 114 is moved into contact with the spring 72. The spring abutment surface 114 is moved toward the spring abutment surface 104 to preload the spring 72 and axially align the bore 90, the slot 96 and the bore 122. The pin 74 is then inserted through the aligned bores to hold the burnishing tool 64 in an assembled condition. The order in which the components of the burnishing tool 64 are assembled can obviously be varied from the above description. The pin 74 can be a bolt, like the bolt 20 described above, or a steel roll pin.

The pin 74 can also have its ends expanded as shown in FIG. 7. The pin 74 is somewhat loose in the transverse bore 122. This loose fit allows the burnishing surface 112 to shift, relative to the shank 66, into alignment with a pipe surface to be burnished by the burnishing surface 112.

The conical burnishing surfaces 78 and 102 extend axially at an angle of 15° to the axis of rotation of the burnishing tool 64. The angle of 15° can be varied from 13° to 17° without a significant increase in the time required to burnish an end of a pipe. Conical burnishing surfaces 100 and 112 extend axially at an angle of 10° to the axis of rotation of the burnishing tool 64. The angle of 10° can be varied from 8° to 12° without a significant increase in the time required to burnish an end of a pipe P.

Figure 8:
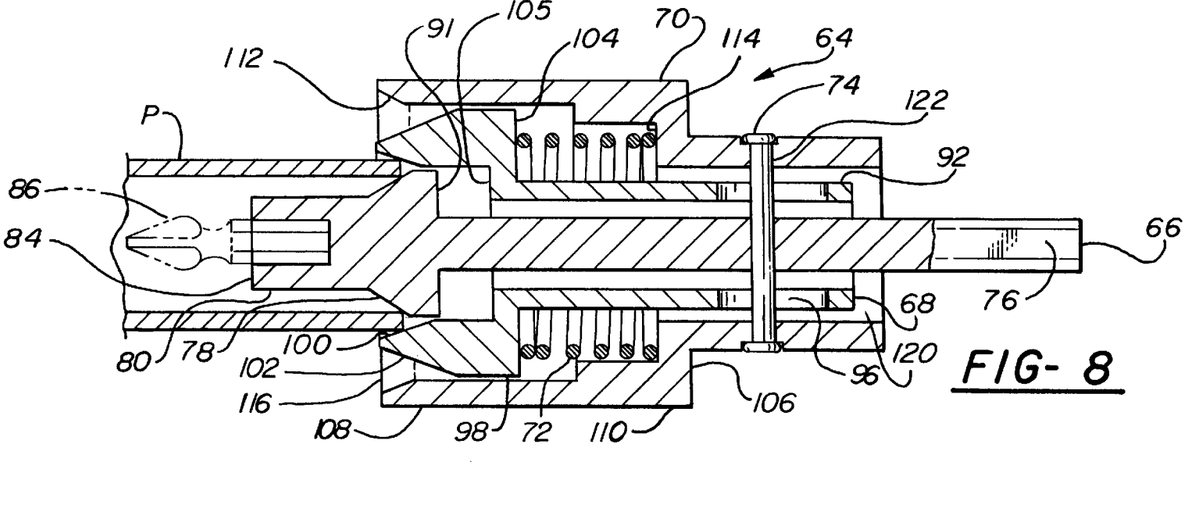
FIG. 8 is a sectional view similar to FIG. 7 with the outside surface and the inside surface of a small diameter pipe in contact with burnishing surface.
Figure 9:
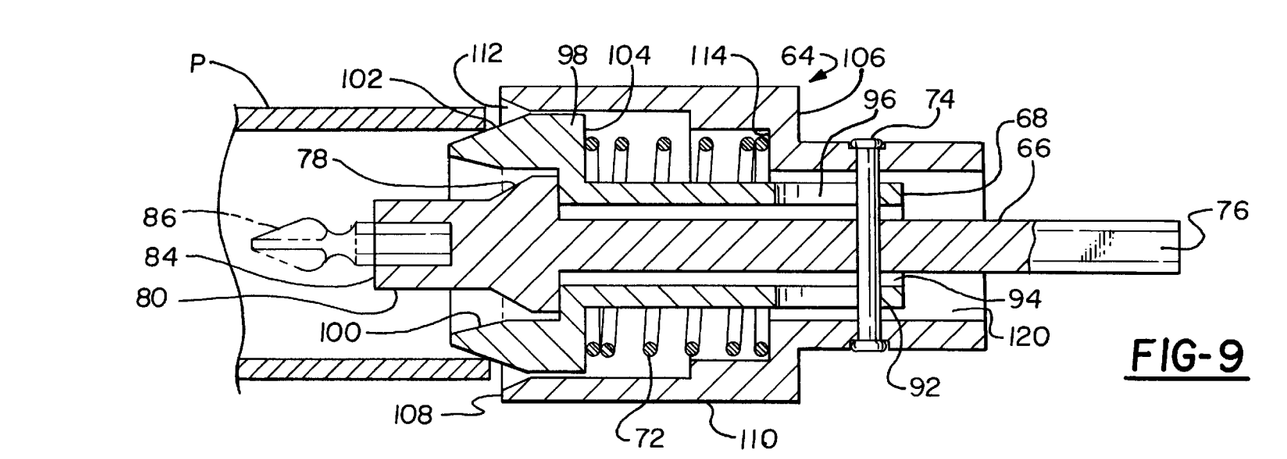
FIG. 9 is a sectional view similar to FIG. 7 with the inside surface of a large diameter pipe in contact with a conical burnishing surface.

The outer cup member 70 of the pipe end burnishing tool 64 is axially fixed relative to the shank 66. The slot 96 in the inner cup member 68 permits limited axial movement of the inner cup member relative to the shank 66. The spring 72 biases the inner cup member 68 to the left as shown in FIG. 9. Movement of the inner cup member 68 to the left as shown in FIG. 9 is limited by the retainer pin 74 and the slot 96 as well as by the stop surface 91 and the stop surface 105. Obviously only one set of stops is required. Movement of the inner cup member 68 to the right as shown in FIGS. 8 and 9 is resisted by the spring 72 and limited by the retainer pin 74 in the slot 96.

Space is provided between the shank 66 and the inner cup member 68 and between the inner cup member and the outer cup member 70. Space is also provided between the pin 74 and the bore 122 in the hub 118. These spaces permit some movement or shifting of the parts relative to each other. This relative movement allows the burnishing surfaces to align on the surfaces of pipes that are being burnished. The relative movement between the parts also reduces the tendency of a pipe P that is being burnished to lock in the burnishing tool 64 and rotate with the tool.

During burnishing of the surfaces of a cut end of a small diameter pipe P with the burnishing tool 64, the burnishing surface 100 on the inner cup member 68 is moved into contact with the outside surface on the end of a pipe as shown in FIG. 7. Axial movement of a drill and the pipe P toward each other compresses the spring 72 and moves the burnishing surface 78 into contact with the inside surface of the cut end of the pipe as shown in FIG. 8. Axial force on the pipe P and the burnishing tool 64 toward each other controls the burnishing of the inside surface of the pipe P. The spring 72 allows the inner cup member 68 to move into a position that accommodates the wall thickness of the pipe P and controls burnishing of the outside surface of a small diameter pipe. The speed of rotation of the burnishing tool 64 may also be used to control operation of the burnishing tool 64 when a variable speed drill is used.

Figure 10:
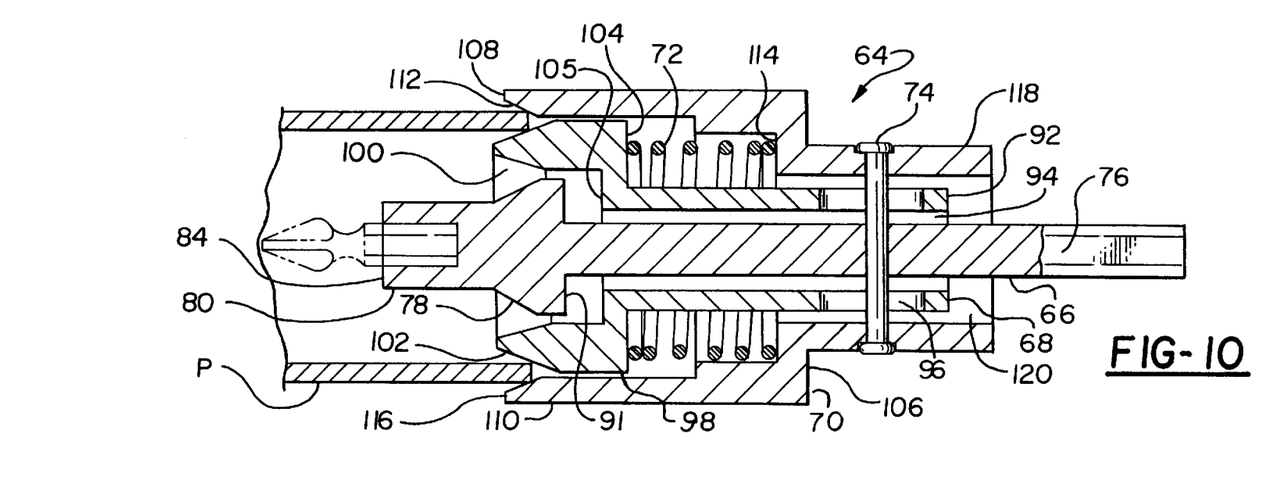
FIG. 10 is a sectional view similar to FIG. 9 with the inside and outside surfaces of a large diameter pipe in contact with conical burnishing surfaces.

During burnishing of the cut end of a large diameter pipe P with the burnishing tool 64, the burnishing surface 102 on the inner cup member 68 is moved into contact with the inside surface on the end of the pipe as shown in FIG. 9. Axial movement of the drill and the pipe P toward each other compresses the spring 72 and moves the burnishing surface 112 into contact with the outside surface on the cut end of the pipe as shown in FIG. 10. Axial force on the pipe P and the burnishing tool 64 toward each other controls burnishing of the outside surface of the pipe P by the burnishing surface 112. The spring 72 allows the inner cup member 68 to move into a position that accommodates the wall thickness of the pipe P and controls burnishing of the inside surface of a large diameter pipe P.

Axial pressure exerted manually on the drill controls the rate of material displacement by the burnishing surfaces 78 or 112 relative to the rate of material displacement by the burnishing surfaces 100 or 102. The axial pressure on burnishing surfaces 100 and 102 is controlled by the spring 72. The speed of rotation of the burnishing tool 64 controls the total time required to displace material and remove chips on the end of a pipe but does not balance material displacement on the inside of a pipe with material displacement on the outside of a pipe P. Balance between material removal on the inside surface and the outside surface is obtained by controlling the axial force on the drill during the burnishing operation.

The terms large diameter and small diameter are used above to describe the pipes P burnished by the burnishing tool 64 described above. The small diameter pipe could, for example, be one-half inch diameter and the large diameter pipe could be three-fourths inch diameter. The small diameter pipe could also, for example, be three-fourths inch diameter and the large diameter pipe could be one inch diameter. Metric size pipe could also be burnished. The burnishing tool 64 can also be constructed to burnish the cut ends of pipes P that are smaller than one-half inch in diameter or larger than one inch in diameter.

The smooth conical burnishing surfaces 30, 48, 78, 100, 102, and 112 work well for pipes with a diameter that is relatively small. For larger diameter pipe, the burnishing surfaces may be roughened slightly by knurling or some similar procedure. If a knurled surface is used on small diameter pipe, material will be removed too fast and control will be difficult. Generally a non-knurled surface works best on pipes with a diameter of two inches or less. A knurled surface is acceptable when burnishing a pipe with a diameter of three inches or more.

The disclosed embodiments are representative of a presently preferred form of the invention, but are intended to be illustrative rather than definitive thereof. The invention is defined in the claims.

I claim:

1. A pipe end burnishing tool for removing burrs and sharp surfaces from the cut ends of pipes comprising: a shank having an axis of rotation, a first end, a second end and wherein the second end is adapted to be connected to a chuck of a drill; a first member with a conical burnishing surface connected to the first end of the shank, rotatable with the shank, and axially fixed relative to the shank; a second member with a conical burnishing surface connected to the first end of the shank, rotatable with the shank, and axially movable relative to the shank and to the first member; and a spring that biases the second member away from the second end of the shank and permits the second member with a conical burnishing surface to move axially relative to the shank to a position in which the conical burnishing surface of the first member and the conical burnishing surface of the second member simultaneously engage a workpiece.

2. A pipe end burnishing tool for removing burrs and sharp surfaces from the cut ends of pipes as set forth in claim 1 wherein the first member with a conical burnishing surface burnishes an outside surface of the cut end of a pipe and the second member with a conical burnishing surface burnishes an inside surface of the cut end of a pipe.

3. A pipe end burnishing tool for removing burrs and sharp surfaces from the cut ends of pipes as set forth in claim 2 wherein the second member with a conical burnishing surface has a second conical burnishing surface axis, the first member with a conical burnishing surface has a first conical burnishing surface axis and wherein the second member with a conical burnishing surface can be moved into a position in which the second conical burnishing surface axis intersects a plane containing the axis of rotation of the shank.

4. A pipe end burnishing tool for removing burrs and sharp surfaces from cut ends of pipes as set forth in claim 3 wherein the first member with a conical burnishing surface can be moved into a position in which the first conical burnishing surface axis intersects a plane containing the axis of rotation of the shank.

5. A pipe end burnishing tool for removing burrs and sharp surfaces from the cut ends of pipes as set forth in claim 1 wherein the second member with a conical burnishing surface has a second conical burnishing surface axis, the first member with a conical burnishing surface has a first conical burnishing surface axis and wherein the second member with a conical burnishing surface can be moved into a position in which the second conical burnishing surface axis intersects a plane containing the axis of rotation of the shank.

6. A pipe end burnishing tool for removing burrs and sharp surfaces from cut ends of pipes as set forth in claim 5 wherein the first member with a conical burnishing surface can be moved into a position in which the first conical burnishing surface axis intersects a plane containing the axis of rotation of the shank.

7. A pipe end burnishing tool for removing sharp surfaces from cut ends of pipes comprising: a shank, having an axis of rotation, that is adapted to be mounted in a chuck, and a first conical burnishing surface carried by the shank; an inside cup member mounted on the shank, a second conical burnishing surface carried by the inside cup member, and a third conical burnishing surface carried by the inside cup member; and an outside cup member mounted on the shank and a fourth conical burnishing surface carried by the outside cup member.

8. A pipe end burnishing tool as set forth in claim 7 wherein the second and third conical burnishing surfaces are axially shiftable along the axis of rotation of the shank relative to the first conical burnishing surface and the fourth conical burnishing surface.

9. A pipe end burnishing tool as set forth in claim 8 including a compression spring seated on the inside cup member and the outside cup member.

10. A pipe end burnishing tool as set forth in claim 7 wherein the first conical burnishing surface cooperates with the second conical burnishing surface to burnish the end of a first pipe and the third conical burnishing surface cooperates with the fourth conical burnishing surface to burnish the end of a second pipe.

11. A pipe end burnishing tool for removing sharp surfaces from cut ends of pipes comprising:

a shank having an axis of rotation, a first end adapted to be mounted in and rotated by a chuck, a shank conical burnishing surface concentric with the shank, facing radially outward and axially away from the first end of the shank, and fixed to a second end of the shank;

a cup member slidably mounted on the shank for slidable movement along said axis of rotation and rotatably fixed relative to the shank;

a first shank stop surface that contacts a first cup stop surface to limit axial movement of the cup member along the axis of rotation of the shank and away from the first end of the shank;

a second shank stop surface that contacts a second cup stop surface to limit axial movement of the cup member along the axis of rotation of the shank toward the first end of the shank;

a spring carried by the shank that urges the first shank stop surface toward engagement with the first cup stop surface; and a cup conical burnishing surface that faces radially inward toward the shank conical burnishing surface and faces axially away from the first end of the shank.

* * * * *

UNITED STATES PATENT AND TRADEMARK OFFICE
CERTIFICATE OF CORRECTION

PATENT NO.  : 6,101,696
DATED       : August 15, 2000
INVENTOR(S) : Sam W. Carter

It is certified that error appears in the above-indentified patent and that said Letters Patent is hereby corrected as shown below:

Page 1, References cited, U.S. Patent Documents,
  2,645,000, change "Neale" to -- Finch --.

Signed and Sealed this

Seventeenth Day of April, 2001

Attest:

NICHOLAS P. GODICI

Attesting Officer

Acting Director of the United States Patent and Trademark Office